(12) United States Patent
Lai et al.

(10) Patent No.: US 11,749,273 B2
(45) Date of Patent: Sep. 5, 2023

(54) SPEECH CONTROL METHOD, TERMINAL DEVICE, AND STORAGE MEDIUM

(71) Applicant: BEIJING XIAOMI PINECONE ELECTRONICS CO., LTD., Beijing (CN)

(72) Inventors: Yongyong Lai, Beijing (CN); Yanbin Fang, Beijing (CN)

(73) Assignee: BEIJING XIAOMI PINECONE ELECTRONICS CO., LTD., Beijing (CN)

(*) Notice: Subject to any disclaimer, the term of this patent is extended or adjusted under 35 U.S.C. 154(b) by 239 days.

(21) Appl. No.: 17/241,777

(22) Filed: Apr. 27, 2021

(65) Prior Publication Data

US 2022/0051668 A1 Feb. 17, 2022

(30) Foreign Application Priority Data

Aug. 17, 2020 (CN) .......................... 202010825753.1

(51) Int. Cl.
  *G10L 15/22* (2006.01)
  *G10L 15/08* (2006.01)
  *G10L 15/18* (2013.01)

(52) U.S. Cl.
  CPC ............ *G10L 15/22* (2013.01); *G10L 15/083* (2013.01); *G10L 15/1815* (2013.01); *G10L 2015/223* (2013.01)

(58) Field of Classification Search
  CPC ....................................................... G10L 15/22
  See application file for complete search history.

(56) References Cited

U.S. PATENT DOCUMENTS

| 2014/0270258 A1* | 9/2014 | Wang ...................... G06F 3/167 381/110 |
| 2019/0317725 A1* | 10/2019 | Shi .......................... G10L 15/22 |

FOREIGN PATENT DOCUMENTS

| EP | 3528244 A1 | 8/2019 |
| WO | WO 2019223351 A1 | 11/2019 |

OTHER PUBLICATIONS

European Patent Application No. 21171081.9 extended Search and Opinion dated Oct. 22, 2021, 11 pages.

* cited by examiner

*Primary Examiner* — Ibrahim Siddo
(74) *Attorney, Agent, or Firm* — COZEN O'CONNOR

(57) ABSTRACT

A speech control method, for a terminal device, includes: receiving an input speech control instruction, obtaining a recognition result of the speech control instruction; searching for an execution object matching the recognition result step by step within a preset search range; and responding to the speech control instruction based on a search result; in which the preset search range at least includes any one of: a current interface of the terminal device when receiving the speech control instruction, at least one application currently running on the terminal device when receiving the speech control instruction, and a system of the terminal device.

17 Claims, 3 Drawing Sheets

SPEECH CONTROL METHOD, TERMINAL DEVICE, AND STORAGE MEDIUM

CROSS-REFERENCE TO RELATED APPLICATION

This application claims the benefit of priority to Chinese Patent Application No. 202010825753.1, filed on Aug. 17, 2020, the entire content of which is incorporated herein by reference.

TECHNICAL FIELD

The disclosure relates to the field of speech control technologies, and more particularly, to a speech control method, a terminal device, and a storage medium.

BACKGROUND

With the rapid progress of science and technology, the interaction modes between a user and a machine such as a terminal device are evolving rapidly. More and more speech assistants have emerged, which are configured to recognize a speech control instruction of the user, to give the corresponding response, and to perform the corresponding operation, thereby achieving speech control of the user on the terminal device.

SUMMARY

According to a first aspect of embodiment of the disclosure, a speech control method is provided, which is applicable to a terminal device, and includes: receiving an input speech control instruction, obtaining a recognition result of the speech control instruction; searching for an execution object matching the recognition result step by step within a preset search range; and responding to the speech control instruction based on a search result; in which the preset search range at least includes any one of: a current interface of the terminal device when receiving the speech control instruction, at least one application currently running on the terminal device when receiving the speech control instruction, and a system of the terminal device.

According to a second aspect of embodiments of the disclosure, a terminal device is provided. The terminal device includes a memory and a processor, in which the memory is configured to store computer instructions that may run on the processor, and the processor is configured to perform speech control based on any of methods described in any of the first aspect when executing the computer instructions.

According to a third aspect of embodiments of the disclosure, a computer-readable storage medium is provided, in which the computer-readable storage medium has stored therein computer programs that, when executed by a processor, causes the processor to perform any of methods described in any of the first aspect when executed by the processor.

It is to be understood that both the foregoing general description and the following detailed description are exemplary and explanatory only and are not restrictive of the disclosure.

BRIEF DESCRIPTION OF THE DRAWINGS

The accompanying drawings herein, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the disclosure is for the purpose of describing exemplary examples only and is not intended to limit the disclosure. As used in the disclosure and the appended claims, the singular forms "a," "an" and "the" are intended to include the plural forms as well, unless the context clearly indicates otherwise. It shall also be understood that the term "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the disclosure, first information may be termed as second information; and similarly, second information may also be termed as first information. As used herein, the term "if" may be understood to mean "when" or "upon" or "in response to" depending on the context.

With the rapid progress of science and technology, the interaction modes between a user and a machine such as a terminal device are evolving rapidly. More and more speech assistants have emerged, which are configured to recognize a speech control instruction of the user, to give the corresponding response, and to perform the corresponding operation, thereby achieving speech control of the user on the terminal device. However, both the efficiency of obtaining information and the accuracy are low in the current speech control mode, which may lead to the low response efficiency and accuracy of the terminal device to the speech control instruction of the user.

In detail, when a response device is an open system of a device with a screen, for example a mobile phone, a tablet computer, a television, the system may be installed with a large number of third-party applications in addition to pre-installed applications of the system. If the capacity of this type of devices is exerted via speech, a speech instruction needs to be responded accurately.

Figure 1:
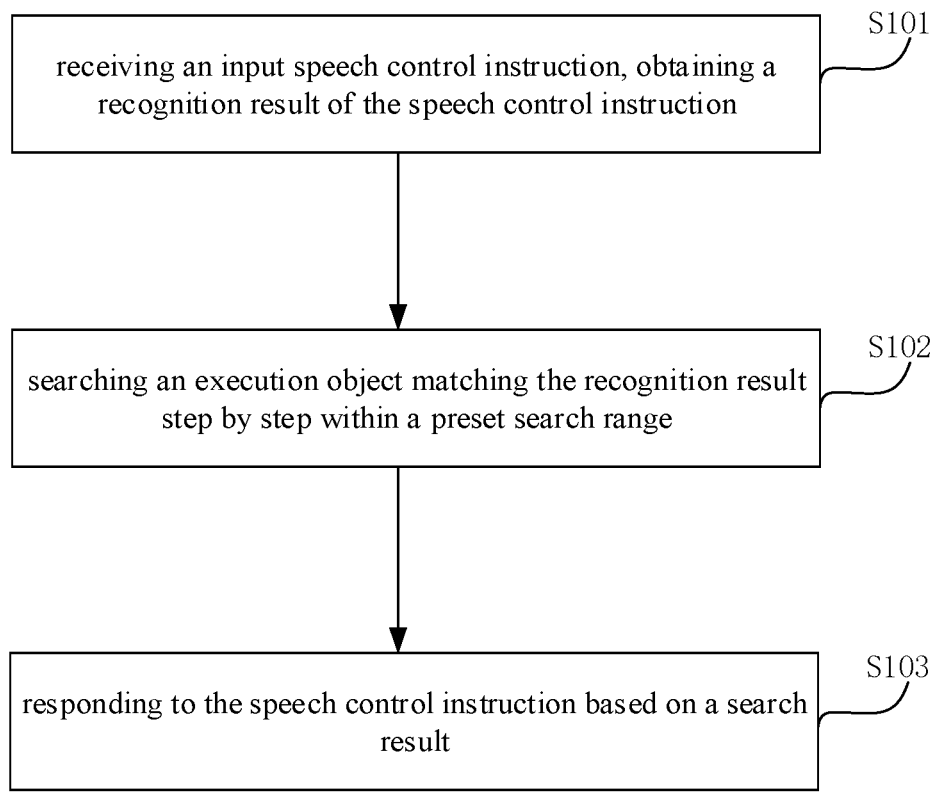
FIG. 1 is a flowchart illustrating a speech control method according to some embodiments of the disclosure.

On the basis of the situations described above, a speech control method is provided in a first aspect of at least one embodiment of the disclosure. Referring to FIG. 1, it illustrates a flow of the control method, and includes blocks S101 to S104.

The speech control method is applicable to a terminal device with a speech collection function, for example, the terminal device may be a smart phone, a tablet computer, a desktop/laptop/handheld computer, a wearable device, a smart speaker, a laptop, an ultra-mobile personal computer (UMPC), a netbook, a cell phone, a personal digital assistant (PDA), an augmented reality (AR)/virtual reality (VR) device, and other devices including touch screens. The embodiments of the disclosure are unintentionally defined on the specific form of the terminal device.

At block S101, an input speech control instruction is received and a recognition result of the speech control instruction is obtained.

At this block, a terminal device may be in a state of allowing speech control, i.e., the terminal device may collect the speech control instruction input by the user in real time. After collecting the speech control instruction, the terminal device needs to perform recognition on the speech control instruction to obtain the speech recognition result.

In an example, speech recognition and semantic recognition are performed for the speech control instruction, to obtain the speech recognition result and the semantic recognition result of the speech control instruction.

At block S102, an execution object matching the recognition result is searched step by step within a preset search range, in which the preset search range at least includes any one of the following: a current interface of the terminal device when receiving the speech control instruction, at least one application currently running on the terminal device when receiving the speech control instruction, and a system of the terminal device.

At this block, the execution object matching the recognition result may be searched within the preset search range based on a preset priority order, the searching may be terminated after the execution object is determined.

In some examples, when the preset search range is one of the current interface of the terminal device when receiving the speech control instruction, the at least one application currently running on the terminal device when receiving the speech control instruction, and the system of the terminal device, the execution object matching the recognition result may be directly searched within the preset search range. For example, the preset search range is the current interface of the terminal device when receiving the speech control instruction, the execution object may be searched directly and only within the current interface of the terminal device when receiving the speech control instruction; after finishing the searching, regardless of whether the execution object is determined, the searching is terminated. For another example, when the preset search range is the at least one application currently running on the terminal device when receiving the speech control instruction, the execution object may be searched directly and only within the at least one application currently running on the terminal device when receiving the speech control instruction; after finishing the searching, regardless of whether the execution object is determined, the searching is terminated. For another example, when the preset search range is the system of the terminal device, the execution object may be searched directly and only within the system of the terminal device; after finishing the searching, regardless of whether the execution object is determined, the searching is terminated.

The preset priority order is: a priority of the current interface of the terminal device when receiving the speech control instruction, a priority of the at least one application currently running on the terminal device when receiving the speech control instruction, and a priority of the system of the terminal device, being decreased in turn.

In some examples, the preset search range includes the current interface of the terminal device when receiving the speech control instruction and the at least one application currently running on the terminal device when receiving the speech control instruction. First, the execution object may be searched within the current interface of the terminal device when receiving the speech control instruction. After finishing the searching, if the execution object is determined, the searching is terminated; if the execution object is not determined, it continues to search for the execution object within the at least one application currently running on the terminal device. After finishing the searching, regardless of whether the execution object is determined, the searching is terminated.

In some examples, the preset search range includes the current interface of the terminal device when receiving the speech control instruction and the system of the terminal device. First, the execution object may be searched within the current interface of the terminal device when receiving the speech control instruction. After finishing the searching, if the execution object is determined, the searching is terminated; if the execution object is not determined, it continues to search for the execution object within the system of the terminal device. After finishing the searching, regardless of whether the execution object is determined, the searching is terminated.

In some examples, the preset search range includes the at least one application currently running on the terminal device when receiving the speech control instruction and the system of the terminal device. First, the execution object may be searched within the at least one application currently running on the terminal device when receiving the speech control instruction. After finishing the searching, if the execution object is determined, the searching is terminated; if the execution object is not determined, it continues to search for the execution object within the system of the terminal device. After finishing the searching, regardless of whether the execution object is determined, the searching is terminated.

In some examples, the preset search range includes the current interface of the terminal device when receiving the speech control instruction, the at least one application currently running on the terminal device when receiving the speech control instruction, and the system of the terminal device. First, the execution object may be searched within the current interface of the terminal device when receiving the speech control instruction. After finishing the searching, if the execution object is determined, the searching is terminated; if the execution object is not determined, it continues to search for the execution object within the at least one application currently running on the terminal device when receiving the speech control instruction. After finishing the searching, if the execution object is determined, the searching is terminated; if the execution object is not determined, it continues to search for the execution object within the system of the terminal device. After finishing the searching, regardless of whether the execution object is determined, the searching is terminated. In an example, the speech control instruction matches within the current interface, the at least one application currently running, and the system successively, which improves the pertinence of responding to the speech control instruction, that is, it may respond on the current interface when it is able to respond on the current interface; it may respond on the application currently running when it is unable to respond on the current interface; and it may respond on the system when it is unable to respond on the application currently running, which improves the efficiency of speech response, the accuracy of speech response, and avoids problems of error response, repeated response, no response and the like, and creates a natural and efficient user experience.

At block S103, it responds to the speech control instruction based on a search result.

Responding to the speech control instruction includes: if the execution object is determined, executing an operation corresponding to the speech control instruction for the execution object; if the execution object is not determined, generating a prompt message, in which the prompt message is configured to indicate that the terminal device is unable to execute the speech control instruction. That is, whether the operation corresponding to the speech control instruction is performed, there is a corresponding response action, so that the user may make the next operation based on the response action.

In the embodiments of the disclosure, the recognition result of the speech control instruction may be obtained. The execution object matching the recognition result may be searched step by step within the preset search range. The speech control instruction may be responded to based on the search result. Since the preset search range includes at least one of the current interface, the at least one application currently running, and the system, at least one level is added to match the received speech control instruction, which may improve the pertinence of responding to the speech control instruction, the efficiency of speech response, and the accuracy of speech response, and avoid problems of error response, repeated response, no response and the like.

In some embodiments, the recognition result includes first semantic information for indicating the execution object of the speech control instruction. The first semantic information may be configured to determine the execution object within the current interface of the terminal device when receiving the speech control instruction.

Figure 2:
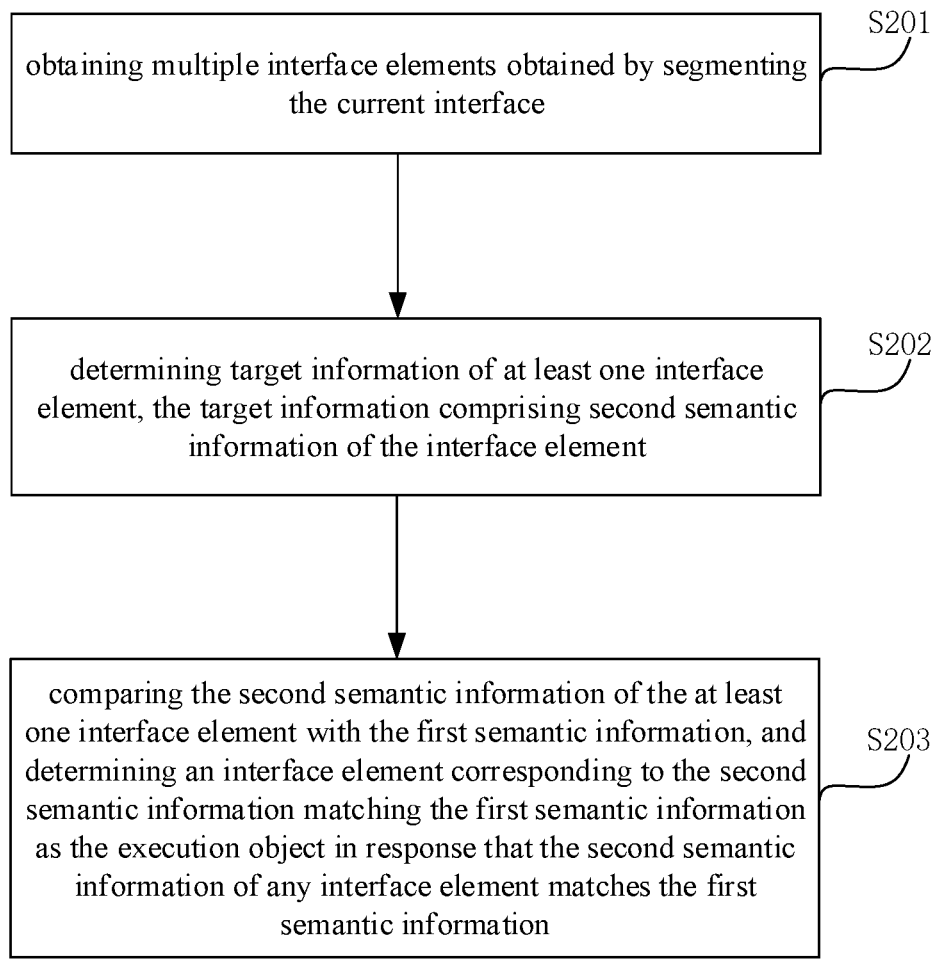
FIG. 2 is a flowchart illustrating a method for searching for an execution object within a current interface of a terminal device when receiving a speech control instruction according to some embodiments of the disclosure.

On the basis of the above form of the recognition result, when the preset search range includes the current interface of the terminal device when receiving the speech control instruction, the execution object matching the recognition result may be searched based on the following method. Referring to FIG. 2, it illustrates a flow of the following method, which includes blocks S201 to S203.

At block S201, multiple interface elements obtained by segmenting the current interface are obtained.

A screen may be segmented into equal proportions to achieve equal segmentation of the screen. A screen may also be segmented into non-equal proportions to achieve non-equal segmentation of the screen, for example, it may be segmented based on effective operation areas, so that each portion after the segmentation corresponds to one effective operation area.

In some embodiments, the current interface may be segmented with boundaries of adjacent control elements as segmenting lines to obtain at least one control element, and each control element is taken as an interface element, in which the current interface includes the at least one control element, and the control element may be a navigation text, an icon, a combination of a text and an icon, etc. Multiple control elements may correspond to a response action. For example, the navigation text and the icon correspond to the same response action. In the combination of the text and the icon, the icon may be the main body of the control element, and the text may be the corresponding identifier, such as, in the list of applications in a mobile terminal, each application corresponds to one control element, and the control element includes not only an icon of the application, but also a name of the application; the control information in the page may be directly obtained by a page processing tool in the system of the terminal device, which at least includes any one of the following: number (ID), position, attribute, etc. of each control element in the page, for example, in an Android system, the control information in the page may be obtained by the system's own Accessibility Service. The control element is taken as a unit to segment, so that each interface element after the segmenting is an independent control unit, which not only has independent second semantic information, but also may be independently taken as a control object, to improve the efficiency and accuracy of segmenting the current interface, and the efficiency and accuracy of subsequent determination of the control object.

At block S202, target information of at least one interface element is determined, in which the target information includes second semantic information of the interface element.

The second semantic information of the interface element may be determined in different ways based on characteristics of the interface element. For example, for the interface element containing text content, text content contained in the interface element may be recognized, and the second semantic information of the interface element is determined based on the text content; for the interface element not containing text content, image recognition may be performed for the interface element to obtain text description information corresponding to the interface element, and the above text description information may be determined as the second semantic information of the interface element. In detail, optical character recognition (OCR) and natural language processing (NLP) may be configured to recognize text content, and the second semantic information of the interface element may be determined based on the recognition result; optical character recognition (OCR) and natural language processing (NLP) may be configured to perform image recognition on the interface element; and a neural network that may be configured for image recognition and extracting text description information may be trained in advance, and image recognition may be performed on the interface element by using this neural network.

At block S203, the second semantic information of the at least one interface element is compared with the first semantic information, and an interface element corresponding to the second semantic information matching the first semantic information is determined as the execution object in response that the second semantic information of any interface element matches the first semantic information. The target information further includes position information of the interface element. Therefore, the execution object may be determined according to the following way. First, the interface element corresponding to the second semantic information matching the first semantic information may be obtained; then, an interface element at a corresponding position of the current interface may be determined as the execution object based on the position information of the obtained interface element. The interface element may be positioned accurately based on the position information of the interface element, which may improve the accuracy of determining the execution object.

In some embodiments, determining the interface element corresponding to the second semantic information matching the first semantic information as the execution object includes: when a text similarity of the first semantic information and the second semantic information exceeds a preset threshold, determining that the second semantic information matches the first semantic information; and determining the interface element corresponding to the second semantic information as the execution object.

For example, semantic features of the first semantic information and the second semantic information are extracted by text matching technologies in the NLP, and the text similarity of the first semantic information and the second semantic information is calculated. When the text similarity exceeds the preset threshold, it is determined that the second semantic information matches the first semantic information, and then the interface element corresponding to the second semantic information is obtained.

In some embodiments, the recognition result further includes third semantic information for determining control content of the speech control instruction. On the basis of the above form of the recognition result, when the preset search range includes the current interface of the terminal device when receiving the speech control instruction, the speech control instruction may be responded based on the following way: performing an operation corresponding to the third semantic information on the execution object. The execution object and the control content of the speech control instruction are determined respectively based on the first semantic information and the third semantic information, thus accurately responding to the speech control instruction and improving the response efficiency, and avoiding problems of error response, repeated response, no response, and the like.

In some embodiments, the recognition result includes intention information, in which the intention information is information configured to indicate an operation intention of the input speech control instruction. The common intention information includes "shopping", "weather query", "music play", "video play", etc.

On the basis of the above form of the recognition result, when the preset search range includes the at least one application currently running on the terminal device when receiving the speech control instruction, and/or the system of the terminal device, the execution object matching the recognition result may be searched based on the following way: determining the execution object based on the intention information and an operation type supported by the application. Each application supports at least one operation type, and these operation types may be simultaneously registered when the applications are installed on the system, and further may be updated when the user uses the applications. For example, the user continuously increases the operation type supported by the application when using. If it is a third-party application, the application needs to provide the external calling capacity, for example intent and/or deeplink, etc.

In some embodiments, when the preset search range includes the at least one application currently running on the terminal device when receiving the speech control instruction, the execution object matching the recognition result is searched based on the following way. First, fourth semantic information corresponding to at least one operation type supported by each application currently running on the terminal device is obtained; the fourth semantic information corresponding to the at least one operation type is compared with the intention information; if the fourth semantic information corresponding to any operation type matches the intention information, the application indicated by the operation type corresponding to the fourth semantic information matching the intention information is determined as the execution object.

In some embodiments, the fourth semantic information corresponding to the at least one operation type may be compared with the intention information based on the preset priority order, for example, the application the current page belongs to may be taken as an application with a top priority, and other applications may be configured in the corresponding priority order. Since the operation type supported by the application the current page belongs to is matched first, the application the current page belongs to may be given priority to execute the instruction, so as to avoid the poor user experience caused by pulling up another application instead of the application the current page belongs to execute the instruction when more than two applications simultaneously satisfy the operation type.

When matching operation types supported by applications, for each application, it may traverse all operation types supported by the corresponding application, that is, each operation type matches the intention information. When the operation type successfully matched exists, the corresponding application is determined as the execution object; when the operation type successfully matched doesn't exist, all operation types of the next application starts to be traversed and matched; when the operation type successfully matched doesn't exist on all applications currently running on the terminal device, the execution object is not searched within the current search range.

For example, the current page is one using interface of Taobao (China's Alibaba splits online shopping unit), and one operation type supported by Taobao is shopping. When the speech control instruction is "buy a schoolbag", the intention information is "shopping" in the recognition result of this speech control instruction, which may successfully match the operation type of shopping. Therefore, the application indicated by the current page of Taobao is determined as the execution object.

In some embodiments, when the preset search range includes the system of the terminal device, the execution object matching the recognition result is searched based on the following way. First, fifth semantic information corresponding to at least one operation type in an operation type response table of the system is obtained, in which the operation type response table includes a mapping relation between operation types and response programs; the fifth semantic information corresponding to the at least one operation type is compared with the intention information; and if the fifth semantic information corresponding to any operation type matches the intention information, the execution object is determined based on the operation type corresponding to the fifth semantic information matching the intention information and the operation type response table.

The operation type response table is a global default instruction response of the system, that is, it may prescribe that any instruction received may be responded by the corresponding application and response manner. With installing, uninstalling and using of applications, the operation type response table may be continuously updated and vary. In addition, in the operation type response table of the system, each operation type corresponds to at least one application, and multiple applications corresponding to the operation type are arranged in a preset priority order. When matching in the system, it may traverse operation types supported by the system, and each operation type matches the intention information in the speech recognition result.

When the operation type matched successfully exists, the corresponding application is further determined as the execution object based on the operation type matched successfully. When the operation type corresponds to one application, the application is directly determined as the execution object; when the operation type corresponds to multiple applications, the priority order of multiple applications is determined, and the application with the top priority is determined as the execution object.

For example, the current page is one using interface of Taobao, and the operation type supported by Taobao is shopping, etc. When the speech control instruction is "watch a movie XXX", there is no relative interface element in the current page. Therefore, the speech recognition result further matches the operation types supported by Taobao. When the speech recognition result fails to match any operation type of Taobao, the speech control instruction fails to be performed on the application to which the current page of Taobao belongs. The speech recognition result further matches the operation types supported by the system. If the system supports such operation type "film and television", the operation type successfully matches the intention information of the speech recognition result, and a Tencent (Tencent is an Internet-based platform company) video in the system may be further determined as the execution object.

In some embodiments, the recognition result further includes slot information corresponding to the intention information and entity information in each slot information, in which each intention information corresponds to at least one slot information, and each slot information may fill in the corresponding entity information based on the recognition result, for example, the intention information "shopping" at least has slot information "goods", and the entity information "schoolbag" may be filled in this slot information, and the intention information "weather report" at least has both slot information "city name" and "time", and both entity information "Beijing" and "2020.08.20" may be filled in correspondingly the slot information "city name" and "time".

On the basis of the above form of the recognition result, when the preset search range includes the at least one application currently running on the terminal device when receiving the speech control instruction, and/or the system of the terminal device, the speech control instruction may be responded based on the following way of performing a corresponding operation on the execution object based on the slot information and the entity information in each slot information. The execution object and the control content of the speech control instruction are determined respectively based on the intention information and the corresponding slot information and entity information, thereby accurately responding to the speech control instruction, improving the response efficiency, and avoiding problems of error response, repeated response, no response, and the like.

Figure 3:
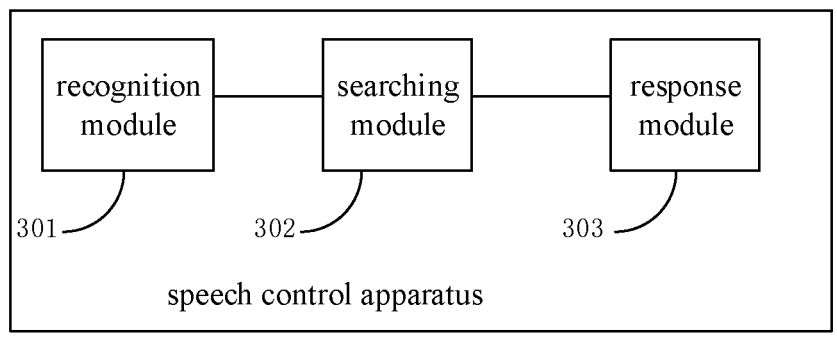
FIG. 3 is a block diagram illustrating a speech control apparatus according to some embodiments of the disclosure.

Referring to FIG. 3, according to a second aspect of embodiments of the disclosure, a speech control apparatus is provided, which is applicable to a terminal device, and includes: a recognition module 301, a searching module 302, and a response module 303.

The recognition module 301 is configured to receive an input speech control instruction and to obtain a recognition result of the speech control instruction.

The searching module 302 is configured to search for an execution object matching the recognition result step by step within a preset search range.

The response module 303 is configured to respond to the speech control instruction based on a search result.

The preset search range at least includes any one of: a current interface of the terminal device when receiving the speech control instruction, at least one application currently running on the terminal device when receiving the speech control instruction, and a system of the terminal device.

In some embodiments, the searching module is configured to: search for the execution object matching the recognition result within the preset search range based on a preset priority order, and terminate the searching after determining the execution object.

In some embodiments, the preset priority order is: a priority of the current interface of the terminal device when receiving the speech control instruction, a priority of the at least one application currently running on the terminal device when receiving the speech control instruction, and a priority of the system of the terminal device, being decreased in turn.

In some embodiments, the recognition result includes first semantic information for indicating the execution object of the speech control instruction. The searching module is configured, in response to the preset search range including the current interface of the terminal device when receiving the speech control instruction, to: obtain multiple interface elements obtained by segmenting the current interface; determine target information of at least one interface element, the target information including second semantic information of the interface element; compare the second semantic information of the at least one interface element with the first semantic information, and determine an interface element corresponding to the second semantic information matching the first semantic information as the execution object in response that the second semantic information of any interface element matches the first semantic information.

In some embodiments, the target information further includes position information of the interface element. The searching module is configured, when determining the interface element corresponding to the second semantic information matching the first semantic information as the execution object to: obtain the interface element corresponding to the second semantic information matching the first semantic information; determine an interface element at a corresponding position of the current interface as the execution object based on the position information of the obtained interface element.

In some embodiments, the recognition result further includes third semantic information for determining control content of the speech control instruction. The response module is configured to: perform an operation corresponding to the third semantic information on the execution object.

In some embodiments, the recognition result includes intention information. The searching module is configured, in response to the preset search range including the at least one application currently running on the terminal device when receiving the speech control instruction, and/or the system of the terminal device, to: determine the execution object based on the intention information and an operation type supported by the application.

In some embodiments, the searching module is configured, in response to the preset search range including the at least one application currently running on the terminal device when receiving the speech control instruction, to: obtain fourth semantic information corresponding to at least one operation type supported by each application currently running on the terminal device; compare the fourth semantic information corresponding to the at least one operation type with the intention information, and determine an application belonged by an operation type corresponding to the fourth semantic information matching the intention information as the execution object in response that the fourth semantic information corresponding to any operation type matches the intention information.

In some embodiments, the searching module is configured, in response to the preset search range including the system of the terminal device, to: obtain fifth semantic information corresponding to at least one operation type in an operation type response table of the system, the operation type response table including a mapping relation between operation types and response programs; compare the fifth semantic information corresponding to the at least one operation type with the intention information, and determine the execution object based on an operation type corresponding to the fifth semantic information matching the intention information and the operation type response table in response that the fifth semantic information corresponding to any operation type matches the intention information.

In some embodiments, the recognition result further includes slot information corresponding to the intention information and entity information in each slot information. The response module is configured to: perform a corresponding operation on the execution object based on the slot information and the entity information in each slot information.

In some embodiments, the response module is configured to: generate a prompt message in response to not determining the execution object, the prompt message for indicating that the terminal device is unable to execute the speech control instruction.

With regard to the apparatuses in the above embodiments, the specific way each module performs the operation has been described in detail in the embodiments of the methods in the first aspect and will not be elaborated herein.

Figure 4:
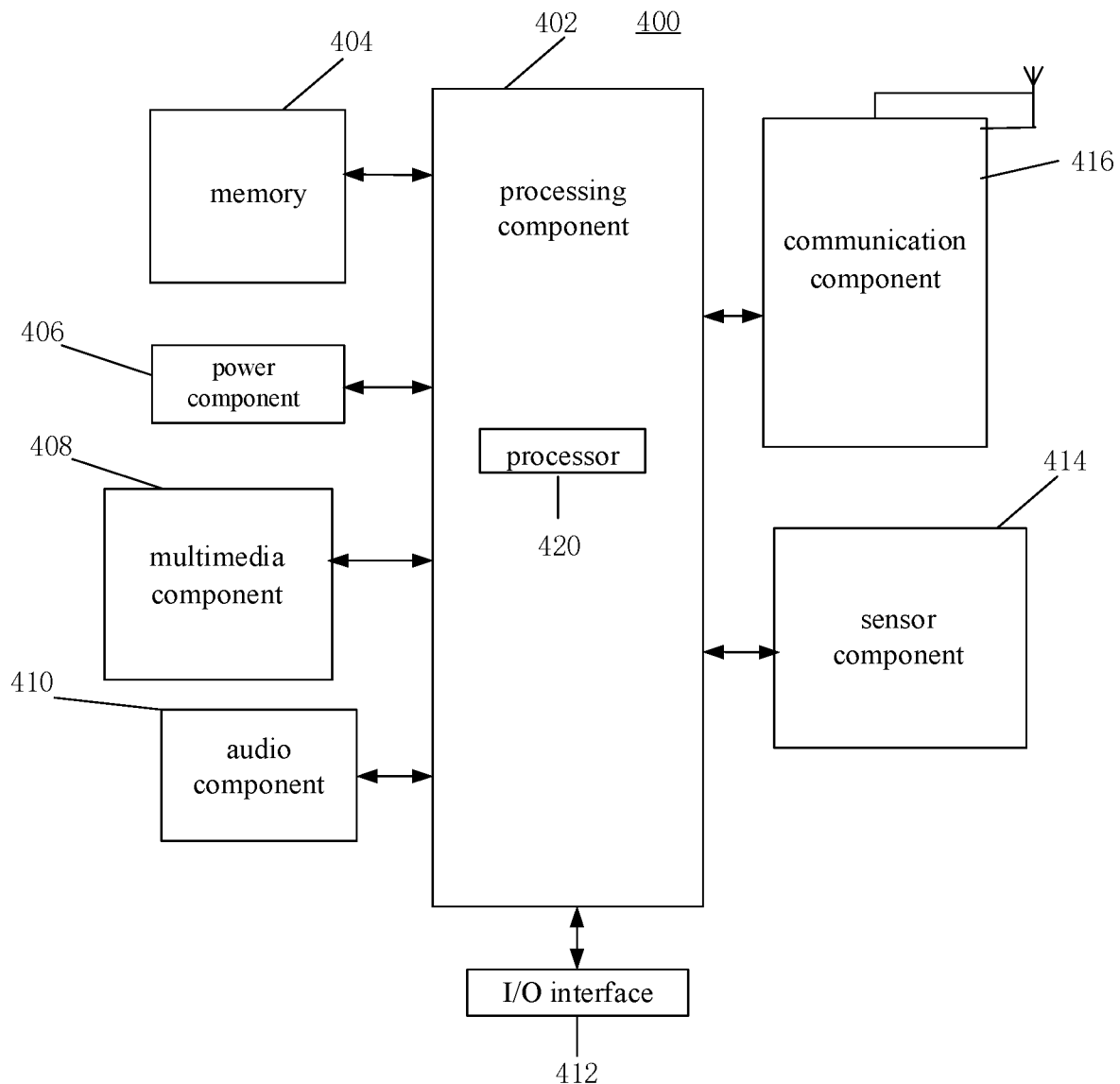
FIG. 4 is a block diagram illustrating a terminal device some embodiments of the disclosure.

According to a third aspect of embodiments of the disclosure, referring to FIG. 4, a block diagram of a terminal device is illustrated. For example, a device 400 may be a mobile phone, a computer, a digital broadcast terminal, a messaging device, a gaming console, a tablet device, a medical device, exercise equipment, a personal digital assistant, and the like.

Referring to FIG. 4, the device 400 may include one or more the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the actions in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as Wi-Fi (Wireless Fidelity), 2G (2-Generation wireless telephone technology), or 3G (3-Generation wireless telephone technology), 4G (4-Generation wireless telephone technology) or 5G (5-Generation wireless telephone technology), or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

According to a fourth aspect, in exemplary embodiments of the disclosure, there is also provided a non-transitory computer-readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

These terms "first" and "second" used in the disclosure are only for description purpose, but may not be understood as relative importance of indication or implication. The term "multiple" refers to two or above, unless otherwise specified.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A speech control method applicable to a terminal device, comprising:
   receiving an input speech control instruction, obtaining a recognition result of the speech control instruction;
   searching for an execution object matching the recognition result step by step within a preset search range, comprising: searching for the execution object matching the recognition result within the preset search range based on a preset priority order, and terminating the searching after determining the execution object; and
   responding to the speech control instruction based on a search result;
   the preset search range at least comprising any one of: a current interface of the terminal device when receiving the speech control instruction, at least one application currently running on the terminal device when receiving the speech control instruction, and a system of the terminal device;
   wherein the preset priority order is: a priority of the current interface of the terminal device when receiving the speech control instruction, a priority of the at least one application currently running on the terminal device when receiving the speech control instruction, and a priority of the system of the terminal device, being decreased in turn.

2. The method as claimed in claim 1, wherein the recognition result comprises first semantic information for indicating the execution object of the speech control instruction;
   and wherein searching for the execution object matching the recognition result in response to the preset search range comprising the current interface of the terminal device when receiving the speech control instruction comprises:
   obtaining multiple interface elements obtained by segmenting the current interface;
   determining target information of at least one interface element, the target information comprising second semantic information of the interface element;
   comparing the second semantic information of the at least one interface element with the first semantic information, and determining an interface element corresponding to the second semantic information matching the first semantic information as the execution object in response that the second semantic information of any interface element matches the first semantic information.

3. The method as claimed in claim 2, wherein the target information further comprises position information of the interface element;
   and wherein determining the interface element corresponding to the second semantic information matching the first semantic information as the execution object comprises:
   obtaining the interface element corresponding to the second semantic information matching the first semantic information; and
   determining an interface element at a corresponding position of the current interface as the execution object based on the position information of the obtained interface element.

4. The method as claimed in claim 2, wherein the recognition result further comprises third semantic information for determining control content of the speech control instruction;
   and wherein responding to the speech control instruction based on the search result comprises:
   performing an operation corresponding to the third semantic information on the execution object.

5. The method as claimed in claim 1, wherein the recognition result comprises intention information;
   searching for the execution object matching the recognition result in response to the preset search range comprising the at least one application currently running on the terminal device when receiving the speech control instruction, and/or the system of the terminal device, comprises:
   determining the execution object based on the intention information and an operation type supported by the application.

6. The method as claimed in claim 5, wherein, searching for the execution object matching the recognition result in response to the preset search range comprising the at least one application currently running on the terminal device when receiving the speech control instruction, comprises:
   obtaining fourth semantic information corresponding to at least one operation type supported by each application currently running on the terminal device;
   comparing the fourth semantic information corresponding to the at least one operation type with the intention information, and determining an application belonged by an operation type corresponding to the fourth semantic information matching the intention information as the execution object in response that the fourth semantic information corresponding to any operation type matches the intention information.

7. The method as claimed in claim 5, wherein, searching for the execution object matching the recognition result in response to the preset search range comprising the system of the terminal device, comprises:
   obtaining fifth semantic information corresponding to at least one operation type in an operation type response table of the system, the operation type response table comprising a mapping relation between operation types and response programs;
   comparing the fifth semantic information corresponding to the at least one operation type with the intention information, and determining the execution object based on an operation type corresponding to the fifth semantic information matching the intention information and the operation type response table in response that the fifth semantic information corresponding to any operation type matches the intention information.

8. The method as claimed in claim 5, wherein, the recognition result further comprises slot information corresponding to the intention information and entity information in each slot information;
   responding to the speech control instruction based on the search result comprises:
      performing a corresponding operation on the execution object based on the slot information and the entity information in each slot information.

9. The method as claimed in claim 4, wherein, responding to the speech control instruction based on the search result comprises:
   generating a prompt message in response to not determining the execution object, the prompt message for indicating that the terminal device is unable to execute the speech control instruction.

10. A terminal device, comprising:
    a processor; and
    a memory for storing computer instructions executable by the processor;
    wherein the processor is configured, when executing the computer instructions, to:
    receive an input speech control instruction, obtain a recognition result of the speech control instruction;
    search for an execution object matching the recognition result step by step within a preset search range; and
    respond to the speech control instruction based on a search result;
    the preset search range at least comprising any one of: a current interface of the terminal device when receiving the speech control instruction, at least one application currently running on the terminal device when receiving the speech control instruction, and a system of the terminal device;
    wherein the processor is configured to:
    search for the execution object matching the recognition result within the preset search range based on a preset priority order, and terminate the searching after determining the execution object;
    wherein the preset priority order is: a priority of the current interface of the terminal device when receiving the speech control instruction, a priority of the at least one application currently running on the terminal device when receiving the speech control instruction, and a priority of the system of the terminal device, being decreased in turn.

11. The terminal device as claimed in claim 10, wherein the recognition result comprises first semantic information for indicating the execution object of the speech control instruction;
    the processor is configured to: search for the execution object matching the recognition result in response to the preset search range comprising the current interface of the terminal device when receiving the speech control instruction by acts of:
    obtaining multiple interface elements obtained by segmenting the current interface;
    determining target information of at least one interface element, the target information comprising second semantic information of the interface element;
    comparing the second semantic information of the at least one interface element with the first semantic information, and determining an interface element corresponding to the second semantic information matching the first semantic information as the execution object in response that the second semantic information of any interface element matches the first semantic information.

12. The terminal device as claimed in claim 11, wherein, the target information further comprises position information of the interface element;
    and wherein determining the interface element corresponding to the second semantic information matching the first semantic information as the execution object, comprises:
    obtaining the interface element corresponding to the second semantic information matching the first semantic information; and
    determining an interface element at a corresponding position of the current interface as the execution object based on the position information of the obtained interface element.

13. The terminal device as claimed in claim 11, wherein, the recognition result further comprises third semantic information for determining control content of the speech control instruction;
    the processor is configured to: respond to the speech control instruction based on the search result by an act of: performing an operation corresponding to the third semantic information on the execution object.

14. The terminal device as claimed in claim 10, wherein, the recognition result comprises intention information;
    the processor is configured to: search for the execution object matching the recognition result in response to the preset search range comprising the at least one application currently running on the terminal device when receiving the speech control instruction, and/or the system of the terminal device, by an act of: determining the execution object based on the intention information and an operation type supported by the application.

15. The terminal device as claimed in claim 14, wherein, the processor is configured to: search for the execution object matching the recognition result in response to the preset search range comprising the at least one application currently running on the terminal device when receiving the speech control instruction, by acts of:
   obtaining fourth semantic information corresponding to at least one operation type supported by each application currently running on the terminal device;
   comparing the fourth semantic information corresponding to the at least one operation type with the intention information, and determining an application belonged by an operation type corresponding to the fourth semantic information matching the intention information as the execution object in response that the fourth semantic information corresponding to any operation type matches the intention information.

16. The terminal device as claimed in claim 14, wherein, the processor is configured to: search for the execution object matching the recognition result in response to the preset search range comprising the system of the terminal device, by acts of:
   obtaining fifth semantic information corresponding to at least one operation type in an operation type response table of the system, the operation type response table comprising a mapping relation between operation types and response programs;
   comparing the fifth semantic information corresponding to the at least one operation type with the intention information, and determining the execution object based on an operation type corresponding to the fifth semantic information matching the intention information and the operation type response table in response that the fifth semantic information corresponding to any operation type matches the intention information.

17. A non-transitory computer-readable storage medium having stored therein computer programs that, when executed by a processor, causes the processor to perform a speech control method, the method being applicable to a terminal device, comprising:
   receiving an input speech control instruction, obtaining a recognition result of the speech control instruction;
   searching for an execution object matching the recognition result step by step within a preset search range, comprising: searching for the execution object matching the recognition result within the preset search range based on a preset priority order, and terminating the searching after determining the execution object; and
   responding to the speech control instruction based on a search result;
   the preset search range at least comprising any one of: a current interface of the terminal device when receiving the speech control instruction, at least one application currently running on the terminal device when receiving the speech control instruction, and a system of the terminal device;
   wherein the preset priority order is: a priority of the current interface of the terminal device when receiving the speech control instruction, a priority of the at least one application currently running on the terminal device when receiving the speech control instruction, and a priority of the system of the terminal device, being decreased in turn.

* * * * *